United States Patent Office 3,313,791
Patented Apr. 11, 1967

3,313,791
OLEFIN POLYMERIZATION IN THE PRESENCE OF A CATALYST COMPRISING TiCl₃ RAlX₂ AND A CHELATE OF AN ALUMINUM COMPOUND
John A. Price, Swarthmore, Pa., and William R. Watt, Newark, Del., assignors to Avisun Corporation, Philadelphia, Pa., a corporation of Delaware
No Drawing. Filed Mar. 24, 1964, Ser. No. 354,425
8 Claims. (Cl. 260—93.7)

This invention relates to a novel catalyst system for the polymerization of alpha olefins having no branching at the 2 position and to a polymerization process employing the same, and more particularly to a three-component catalyst system consisting of titanium trichloride, an alkyl aluminum dihalide, and an aluminum compound having the generic formula

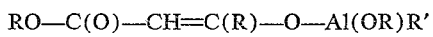

wherein R is a lower alkyl radical, and R' is a lower alkoxy radical or —O—C(R)=CH—C(O)OR. It is believed that these compounds are in fact chelates having the structure

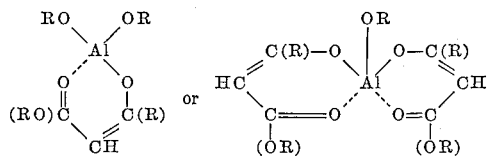

It is known that alpha olefins may be polymerized in the presence of catalysts consisting of titanium trichloride and an aluminum trialkyl or a dialkyl aluminum halide, to form solid crystalline polymers having utility in the fabrication of molded articles, films, and fibers. These aluminum alkyls are spontaneously flammable in the presence of air, and consequently present a considerable fire hazard in use. It is not possible to use an alkyl aluminum dihalide, which is not spontaneously flammable and consequently safer to use, as the second component of the catalyst system, since the combination of titanium trichloride with the alkyl aluminum dihalide will not catalyze the polymerization of alpha olefins to solid polymers, as shown in U.S. Patents 2,967,206 and 3,081,287, and Belgian Patent No. 605,604.

It is an object of this invention to provide a coordination catalyst system for the polymerization of alpha olefins to solid crystalline polymers, utilizing an alkyl aluminum dihalide as the organometallic component of the catalyst.

It has been found according to the present invention that a catalyst system consisting of the product obtained by mixing, in an inert solvent, titanium trichloride, an alkyl aluminum dihalide, and an alkoxy aluminum compound having the formula

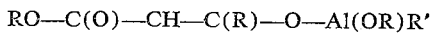

wherein R is a lower alkyl radical, and R' is a lower alkoxy radical or RO—C(O)—CH=C(R)—O—, and wherein the mol ratio of alkyl aluminum dihalide to titanium trichloride is from about 0.5:1 to about 10:1, and wherein the mol ratio of alkyl aluminum dihalide to alkoxy oxygen in the alkoxy aluminum compound is from about 2:1 to about 1:1.5 will polymerize alpha olefins to solid crystalline polymers in good yield, while yielding as a by-product only a very small amount of non-crystalline, pentane-soluble polymers.

The alkyl aluminum dihalide component of our new catalyst may be any in which the alkyl group contains no more than 8 carbon atoms, such as, for example, methyl aluminum dichloride, ethyl aluminum dichloride, isobutyl aluminum dichloride, propyl aluminum dichloride, hexyl aluminum dichloride, octyl aluminum dichloride, and the bromine and iodine analogues.

Olefins which may be polymerized with the new catalyst system include ethylene, propylene, butene-1, 4-methyl pentene-1, octene-1, and other straight or branched chain alpha olefins, provided only that there is no branching at the 2 position.

In carrying out polymerization in accordance with the invention, the catalyst components are dissolved or suspended in an inert hydrocarbon solvent such as hexane, heptane, or octane, or mixtures thereof, in an appropriate reaction vessel, in the absence of oxygen and moisture. The catalyst-containing solvent is then brought to the desired polymerization temperature, usually from about 25° C. to about 150° C., preferably about 60° C. to 80° C., although higher or lower temperatures may be used, and the olefin to be polymerized is introduced into the reaction vessel. When the olefin to be polymerized is liquid at the reaction temperature chosen, atmospheric pressure may be used, but when the olefin is gaseous at reaction temperature, moderately elevated pressures are used, say from 20 to 150 p.s.i.g., in order to increase the amount of olefin dissolved in the solvent, and thus speed the reaction.

In order that those skilled in the art may more fully understand the nature of the invention and the manner of carrying it out, the following examples are given.

EXAMPLE I 3.9 millimols of ethyl aluminum dichloride (EADC), 1.2 millimols of TiCl₃, and 0.6 millimols of a chelate having the formula

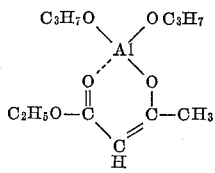

(hereinafter referred to as Chelate I) are stirred together in 100 ml. of hexane for 30 minutes at 70° C. in a closed polymer bottle under a nitrogen atmosphere. The mol ratio of ethyl aluminum dichloride to TiCl₃ to alkoxy oxygen in Chelate I is 3.2:1:1.5. Propylene is then added continuously for a period of 24 hours, while maintaining a pressure of 40 p.s.i.g. inside the bottle. The reaction mixture is stirred and maintained at 70° C. by external heating during this period. At the end of the 24 hours, addition of propylene is discontinued, the mixture is cooled to room temperature, and the catalyst is destroyed by addition of 5 ml. of methanol. The polymer is filtered off, washed once with hexane, once with a 50% by volume solution of isopropanol in methanol and twice with methanol in a Waring Blendor. The solid polymer is dried at 60° C. in a vacuum oven overnight. The dried polymer weighs 7.0 grams. A small amount of pentane-soluble polymer is also produced. The solid polymer is 88.5% of the total polymer produced.

EXAMPLE II

The procedure of Example I is followed, increasing Chelate I to 1.0 millimols. The ratio of EADC to TiCl₃ to alkoxy oxygen is 3.2:1:2.5. 20.7 grams of pentane-insoluble polymer, representing 94.1% of the total polymer, are recovered.

EXAMPLE III

The procedure of Example I is followed, increasing Chelate I to 1.4 millimols. The EADC to TiCl₃ to alkoxy oxygen ratio is 3.2:1:3.5. 37.4 grams of pentane-insoluble polymer are recovered. In a check run under the same conditions, 33.4 grams of pentane-insoluble polymer, representing 94.2% of total polymer, are recovered.

EXAMPLE IV

The procedure of Example I is followed, increasing Chelate I to 2.0 millimols. The EADC to TiCl₃ to alkoxy oxygen ratio is 3.2:1:5. 3.2 grams of pentane-insoluble polypropylene are recovered.

EXAMPLE V

The procedure of Example I is followed, except that 1.95 millimols of EADC and 0.7 millimols of Chelate I are used. The ratio of EADC to TiCl₃ to alkoxy oxygen is 1.6:1:1.75. 30.3 grams of pentane-insoluble polypropylene are recovered.

EXAMPLE VI

Example III is repeated, except that ethyl aluminum dibromide is substituted for EADC. 28.9 grams of pentane-insoluble polymer are produced.

EXAMPLE VII

Example III is repeated, substituting isobutyl aluminum dichloride for EADC. 35.6 grams of pentane-insoluble polypropylene are formed.

EXAMPLE VIII

The general procedure of Example I is followed, except that 13.2 grams of 4-methyl pentene-1 is used instead of propylene, pressure is atmospheric, reaction time is 4 hours, and the catalyst of Example III is used. 5.6 grams of pentane-insoluble poly(4-methylpentane-1) are recovered.

EXAMPLE IX

The procedure of Example I is followed, substituting 0.5 millimols of Chelate II for the 0.6 millimols of Chelate I used in that example. Chelate II has the formula

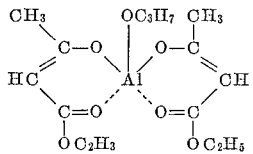

3.2 grams of pentane-insoluble polypropylene are recovered.

EXAMPLE X

Example II is repeated, substituting Chelate II for Chelate I. 10.3 grams of pentane-insoluble polypropylene are recovered.

EXAMPLE XI

Example III is repeated, substituting Chelate II for Chelate I. 30.6 grams of pentane-insoluble polypropylene, representing 95.6% of total polymer produced, are recovered.

The invention claimed is:

1. A polymerization process which comprises contacting, in an inert solvent, an alpha olefin having no branching in the 2 position with a catalyst consisting essentially of the product obtained by mixing, in an inert solvent, titanium trichloride, an alkyl aluminum dihalide, and an alkoxy aluminum compound having the generic formula:

RO—C(O)—CH=C(R)—O—Al(OR)R′ wherein R is a lower alkyl radical, and R′ is selected from the group consisting of lower alkoxy radicals and

—O—C(R)=CH—C(O)OR wherein the mol ratio of alkyl aluminum dihalide to titanium trichloride is from about 0.5:1 to about 10:1, and the mol ratio of alkyl aluminum dihalide to alkoxy oxygen in the alkoxy aluminum compound is from about 2:1 to about 1:1.5.

2. A process according to claim 1 in which the alkyl aluminum dihalide is ethyl aluminum dichloride.

3. A process according to claim 2 in which the alkoxy aluminum compound is

C₂H₅O—C(O)—CH=C(CH₃)—O—Al(OC₃H₇)₂

4. The process according to claim 2 in which the alkoxy aluminum compound is (C₂H₅O—C(O)—CH=C(CH₃)—O)₂AlOC₃H₇

5. As a new composition of matter, the product obtained by mixing, in an inert solvent, titanium trichloride, an alkyl aluminum dihalide, and an alkoxy aluminum compound having the generic formula:

RO—C(O)—CH=C(R)—O—Al(OR)R′ wherein R is a lower alkoxy radical, and R′ is selected from the group consisting of lower alkoxy radicals and —O—C(R)=CH—C(O)OR, wherein the mol ratio of alkyl aluminum dihalide to titanium trichloride is from about 0.5:1 to about 10:1, and the mol ratio of alkyl aluminum dihalide to alkoxy oxygen in the alkoxy aluminum compound is from about 2:1 to about 1:1.5.

6. The composition according to claim 5 in which the alkyl aluminum dihalide is ethyl aluminum dichloride.

7. The composition according to claim 6 in which the alkozy aluminum compound is (C₂H₅O—C(O)—CH=C(CH₃)—O)Al(OC₃H₇)₂

8. The composition according to claim 5 in which the alkoxy aluminum compound is (C₂H₅O—C(O)—CH=C(CH₃)—O)₂AlOC₃H₇

No references cited.

JOSEPH L. SCHOFER, *Primary Examiner.*

M. B. KURTZMAN, *Assistant Examiner.*